United States Patent
Harris

(10) Patent No.: US 8,015,998 B2
(45) Date of Patent: Sep. 13, 2011

(54) METHOD FOR PATCHING OR SEALING LEAKS IN FLUID SYSTEMS

(75) Inventor: Todd K Harris, Olney, IL (US)

(73) Assignee: Harris Mud & Chemical, Inc., Olney, IL (US)

( * ) Notice: Subject to any disclaimer, the term of this patent is extended or adjusted under 35 U.S.C. 154(b) by 938 days.

(21) Appl. No.: 11/195,560

(22) Filed: Aug. 2, 2005

(65) Prior Publication Data
US 2006/0033075 A1 Feb. 16, 2006

Related U.S. Application Data

(60) Provisional application No. 60/601,012, filed on Aug. 12, 2004, provisional application No. 60/612,545, filed on Sep. 23, 2004.

(51) Int. Cl.
*F16L 55/18* (2006.01)

(52) U.S. Cl. ............. 138/97; 405/184.1; 264/36.16; 166/293

(58) Field of Classification Search .......... 138/97; 166/293; 264/36.16; 405/184.1
See application file for complete search history.

(56) References Cited

U.S. PATENT DOCUMENTS

| | | | | |
|---|---|---|---|---|
| 3,272,894 A * | 9/1966 | Lee | ............ | 264/36.16 |
| 3,472,285 A * | 10/1969 | Ginsburgh et al. | ............ | 138/97 |
| 3,644,208 A * | 2/1972 | Krueger | ............ | 252/72 |
| 3,645,331 A | 2/1972 | Maurer et al. | ............ | 175/65 |
| 3,766,013 A * | 10/1973 | Forgione et al. | ............ | 435/182 |
| 4,026,976 A * | 5/1977 | Anderson | ............ | 264/36.16 |
| 4,073,836 A * | 2/1978 | Harrison et al. | ............ | 264/36.16 |
| 4,187,143 A * | 2/1980 | Sander et al. | ............ | 162/157.3 |
| 4,379,067 A | 4/1983 | Packo et al. | ............ | 252/67 |
| 4,439,561 A * | 3/1984 | Barber | ............ | 524/13 |
| 4,460,642 A | 7/1984 | Errede et al. | ............ | 428/283 |
| 4,487,707 A | 12/1984 | Holzknecht | ............ | 252/68 |

(Continued)

OTHER PUBLICATIONS

Product Information Dupont Teflon PTFE 601A, Fluoropolymer Resin, Fine Powder Lubricateed Extrusion Resin, 1999, 2 pages.

(Continued)

*Primary Examiner* — James Hook
(74) *Attorney, Agent, or Firm* — Baker & Daniels LLP

(57) ABSTRACT

A method for patching or sealing leaks in fluid systems and, in an exemplary application, to a method of patching or sealing leaks in sub-sea hydraulic control lines, leaks in sub-surface or sub-sea safety valves, O-ring leaks of any type, leaks in hydraulic line fittings, tubing thread connection leaks, casing thread connection leaks, glycol hydraulic system leaks, well-head and sub-sea well-head leaks, hanger leaks, and leaks in other types of related down-hole equipment. A pressure- or shear-fibrillatable substance, such as an aqueous fluoropolymer dispersion, a fluoropolymer fine powder, or any other fluoropolymer which is derived from a dispersion polymerization process, is added to a fluid system such as a hydraulic control line, and pressure is then applied to the system. In one embodiment, an aqueous dispersion of polytetrafluoroethylene ("PTFE") particles having a particle size between 0.01 and 10 microns is used. Under the applied pressure and, in one embodiment, under cycling of the pressure, the fluororpolymer particles in the dispersion are forced through the leak site with resulting shear force, causing fibrillation of the individual fluororpolymer particles with resulting intertwining and coalescing of the individual fluororpolymer fibrils at the leak site, wherein the fluoropolymer fibrils form a dense, intertwined and coalesced matrix, impacting and embedding the fibrils within the leak site to effectively seal the leak.

39 Claims, 5 Drawing Sheets

U.S. PATENT DOCUMENTS

| | | | | |
|---|---|---|---|---|
| 4,524,158 | A | * | 6/1985 | Barber .......................... 523/130 |
| 4,524,159 | A | * | 6/1985 | Barber .......................... 523/177 |
| 4,564,661 | A | | 1/1986 | Beresniewicz ................ 526/212 |
| 4,990,544 | A | * | 2/1991 | Asaumi et al. ................ 521/145 |
| 5,324,785 | A | * | 6/1994 | Noda et al. .................... 525/276 |
| 5,405,923 | A | | 4/1995 | Aten |
| 5,416,156 | A | * | 5/1995 | Kamen .......................... 524/520 |
| 5,417,873 | A | | 5/1995 | Packo ............................ 252/72 |
| 5,954,132 | A | | 9/1999 | Harris et al. .................. 166/293 |
| 5,980,984 | A | * | 11/1999 | Modera et al. ................ 427/237 |
| 6,105,673 | A | | 8/2000 | Harris et al. .................. 166/277 |
| 6,475,406 | B1 | | 11/2002 | Bowers .......................... 252/68 |
| 6,476,120 | B1 | | 11/2002 | Bowers .......................... 524/546 |
| 6,767,395 | B2 | * | 7/2004 | Erick .............................. 106/33 |
| 6,870,020 | B2 | | 3/2005 | Aten et al. .................... 526/247 |
| 7,127,902 | B1 | * | 10/2006 | Levy ................................ 62/77 |
| 7,690,427 | B2 | * | 4/2010 | Rispler .......................... 166/293 |
| 2003/0130393 | A1 | * | 7/2003 | Cavanaugh et al. .......... 524/366 |
| 2004/0107867 | A1 | * | 6/2004 | Gallagher et al. ........... 106/14.44 |
| 2005/0250908 | A1 | * | 11/2005 | Briers et al. .................. 525/199 |

OTHER PUBLICATIONS

Product Information Dupont Teflon PTFE 612A, Fluoropolymer Resin, Fine Powder Lubricateed Extrusion Resin, 2000, 2 pages.

Product Information Dupont Teflon PTFE K-10, Fluoropolymer Resin, 1999, 2 pages.

Product Information Dupont Teflon PTFE 30B, Fluoropolymer Resin, Aqueous Dispersion, 1999, 4 pages.

Article—"Effects of Convergent Flow on In Situ Fibrillation of TLCP in PEN," L. Lie et al., Journal of Applied Polymer Science, vol. 91, 1505-1513, 2004.

Article—"Use of Pressure Activated Sealants to Cure Sources of Casing Pressure," David W. Rusch et al., SPE 55996, 1999, 5 pages.

Article—"Leak-Sealant in Hydraulic Systems Minimizes Maintenance Costs in Offshore Wells," Miguel A. Mendoza, et al., SPE 59026, 2000, 4 pages.

Article—"New Workover and Completion Technology Utilised in Bass Strait," M. L. Eaton, et al., SPE 64400, 2000, 7 pages.

* cited by examiner

METHOD FOR PATCHING OR SEALING LEAKS IN FLUID SYSTEMS

CROSS-REFERENCE TO RELATED APPLICATIONS

This application claims the benefit under Title 35, U.S.C. §119(e) of U.S. Provisional Patent Application Ser. No. 60/601,012, entitled METHOD FOR PATCHING OR SEALING LEAKS IN FLUID SYSTEMS, filed on Aug. 12, 2004, and U.S. Provisional Patent Application Ser. No. 60/612,545, entitled METHOD FOR PATCHING OR SEALING LEAKS IN FLUID SYSTEMS, filed on Sep. 23, 2004.

BACKGROUND OF THE INVENTION

1. Field of the Invention.

The present invention relates to a method for patching or sealing leaks in fluid systems and, in an exemplary application, relates to a method for patching or sealing leaks in hydraulic fluid control systems of the type which are used in oil and gas production applications, such as leaks in sub-sea hydraulic control lines, leaks in sub-surface or sub-sea safety valves, O-ring leaks of any type, leaks in hydraulic line fittings, tubing thread connection leaks, casing thread connection leaks, glycol hydraulic system leaks, well-head and sub-sea well-head leaks, hanger leaks, and leaks in other types of related down-hole equipment, for example.

2. Description of the Related Art.

In the oil industry, offshore oil platforms are used to extract oil from oil reservoirs located within continental shelves beneath the sea floor, and to convey the extracted oil to the ocean surface. Typically, an oil platform is positioned above the sea floor, and one or more wells, complete with all the necessary components to operate in the sub-sea environment, is installed on the sea floor. The well includes apparatus for extracting oil from oil reservoirs beneath the sea floor, and is equipped with a hydraulically controlled down-hole safety valve. The well is used to convey the oil upwardly to a production facility. A hydraulic fluid control system is commonly used to control the operation of the sub-sea components and down-hole safety valves, and includes a series of hydraulic control lines extending from a control apparatus on the platform downwardly to a hydraulic control pod associated with the sub-sea installation on the sea floor, or directly to the safety valve in an above surface well-head. The hydraulic control lines are used to operate valves and other controls on the sub-sea installation or down-hole. The hydraulic control lines are typically approximately ¼" (0.635 cm) in inside diameter, and may be arranged in bundles which extend from the platform or production facility to the sub-sea installation.

Problematically, it has been observed that leaks frequently develop in the high pressure hydraulic control lines, in the fittings which connect the control lines to other system components, or anywhere else in the production system. It is estimated that the hydraulic control systems of offshore oil platforms around the United States alone may have thousands of such leaks. Although such leaks are typically small, the high pressure of the hydraulic fluid within the control systems potentially leads to a large amount of total leakage of hydraulic fluid into the ocean, affecting the proper functioning of the system and risking possible environmental contamination, especially when the control systems are operated continuously for long periods of time. Problematically, once such hydraulic control systems are operational, identifying individual leaks in the systems is very difficult. Even if a leak is identified, shutting the hydraulic control system down to retrieve and repair system components is at best extremely difficult and expensive, and is at worse almost impossible.

One known method for patching leaks which occur in oil well casings, for example, is described in U.S. Pat. Nos. 5,954,132 and 6,105,673, each to Harris et al., the disclosures of which are expressly incorporated herein by reference. In this method, two reactive aqueous liquids are pressure injected into an annulus formed between a well casing and a concentric tubing. The fluids react with one another to yield a solution having liquid and solid phase materials, and the liquid phase materials are pressed from the solid phase materials to deposit a filter cake on the casing at the leak site to patch the leak.

Although the foregoing method has proven to be very effective for patching leaks in oil well casings, for example, it is contemplated that such method would not be as effective or suitable for patching the relatively small sized leaks which frequently occur in hydraulic control systems for risk of plugging the small diameter lines of such systems. Additionally, the abrasiveness of the crystalline materials produced in the foregoing method could potentially result in ineffective patching of many types of leaks which occur in hydraulic control systems, such as leaks associated with fittings and valves having defective O-rings, for example.

U.S. Pat. No. 4,487,707 to Holzknecht discloses a leak sealing composition and method for refrigeration systems. A leak sealing composition is disclosed which includes one part graphite particles, one part polytetrafluoroethylene ("PTFE") particles, and five parts mineral oil, for example. Although PTFE particles are disclosed, however, Holzknecht states that "graphite particles alone suspended in refrigeration oil are effective as a leak sealant" (col. 3, lines 48 and 49), and only graphite particles and refrigeration oil are used in the working examples (col. 4, line 30 through col. 5, line 31). The composition is disclosed as useful for sealing holes in metal components up to about 0.015 inch in diameter, as well as voids in gasketed or O-ring type joints up to about 0.008 inches (col. 3, lines 24-30).

Suitable PTFE particles are disclosed as being available from Custom Compounding, Inc., under the name Polylube® in the form of elongated particles in the range of 20 to 50 microns or 20 microns to 65 mesh. PTFE particles of the foregoing type are known in the art as micropowders, or granular PTFE particles, and are produced by a known suspension polymerization processes. Referring to FIG. 1, Holzknecht states that "[a]dvantageously, particles 14 and 15 of the invention will tend to be forced out through the pinhole by the internal pressure. We have found experimentally that particles 14 and 15 will agglomerate and under continued pressure will agglutinate to fill the pinhole, thereby preventing further leakage of the refrigerant 12". (col. 3, lines 15-21).

Thus, the method of Holzknecht employs micropowders of PTFE particles, such as the disclosed Polylube® product, which are typically available in solid form, and may be suspended in a viscous carrier medium such as oil and/or glycol for use as a lubricant, for example. When in solid form, it is known that the individual PTFE micropowder particles tend to agglomerate, or clump together, to form agglomerated functional particles which are much larger than their nominal particle size. It is believed that the mechanism by which such micropowders effect a seal at a leak site is by agglomerating or agglutinating with one another to close or seal the leak by physically "bridging" the leak site without the particles themselves undergoing a physical change at the level of the individual particles. This effectively limits the size of leaks which can be sealed using PTFE particles in micropowder form and/or graphite particles. For example, in "Test No. 1" of Holzknecht, a composition including "2 ounces of 525 VIS refrigeration oil having 1.5 parts #A-60 graphite particles and 1.5 parts 4110 particles" was unable to seal a relatively small leak in a refrigeration system which was formed with a 0.027 inch needle.

What is needed is a method for patching leaks in fluid systems, particularly in hydraulic control systems, which is an improvement over the foregoing.

SUMMARY OF THE INVENTION

The present invention provides a method for patching or sealing leaks in fluid systems and, in an exemplary application, to a method of patching or sealing leaks in sub-sea hydraulic control lines, leaks in sub-surface or sub-sea safety valves, O-ring leaks of any type, leaks in hydraulic line fittings, tubing thread connection leaks, casing thread connection leaks, glycol hydraulic system leaks, well-head and sub-sea well-head leaks, hanger leaks, and leaks in other types of related down-hole equipment, for example. A pressure- or shear-fibrillatable substance, such as an aqueous fluoropolymer dispersion, a fluoropolymer fine powder, or any other fluoropolymer which is derived from a dispersion polymerization process, is added to a fluid system such as a hydraulic control line, and pressure is then applied to the system. In one embodiment, an aqueous dispersion of polytetrafluoroethylene ("PTFE") particles having a particle size between 0.01 and 10 microns is used. Under the applied pressure and, in one embodiment, under cycling of the pressure, the fluororpolymer particles in the dispersion are forced through the leak site with resulting shear force, causing fibrillation of the individual fluororpolymer particles with resulting intertwining and coalescing of the individual fluororpolymer fibrils at the leak site, wherein the fluororpolymer fibrils form a dense, intertwined and coalesced matrix, impacting and embedding the fibrils within the leak site to effectively seal the leak.

According to one embodiment, the present invention is effective for sealing leaks in sub-sea hydraulic control lines, leaks in sub-surface or sub-sea safety valves, O-ring leaks of any type, leaks in hydraulic line fittings, tubing thread connection leaks, casing thread connection leaks, glycol hydraulic system leaks, well-head and sub-sea well-head leaks, hanger leaks, and leaks in other types of related down-hole equipment. The amount of the fibrillatable substance added to the system to seal the leak is dependent upon the overall size of the system and the estimated size of the leak. In one example, 5 cc of an aqueous PTFE dispersion was found to be effective to plug a leak having a leak rate of 150 cc/min. After the fibrillatable substance is added to the fluid system, a force of at least 500 psig (3445 kPa) is typically required to produce enough shear force to cause fibrillation of the particles of the substance and resulting coagulation. More preferably, a greater force is applied, typically 1000 psig (6890 kPa), 1400 psig (9646 kPa), 1500 psig (10335 kPa), or more.

Advantageously, the present invention employs aqueous fluororpolymer substances which are derived from dispersion polymerization processes, such as aqueous fluoropolymer dispersions and fluoropolymer fine powders, to patch or seal leaks in fluid systems, which substances are widely and inexpensively available from many commercial sources. Furthermore, fluororpolymers such as PTFE remain in their original chemical forms during and after the present process, and do not react with the fluid within the system to potentially degrade the leak patch or the system components. The use of fluoropolymers does not pose significant environmental concerns. Also, the present invention, according to one embodiment, employs only a single component, namely, a fluoropolymer substance which is derived from a dispersion polymerization process, and therefore does not require a mixture of several chemical components to produce a chemical reaction in the fluid system to generate a precipitate or to polymerize monomers to patch the leak, as in many known leak patching or sealing methods.

In one form thereof, the present invention provides a method of patching or sealing a leak in a fluid system having at least one leak site, including the steps of adding a fibrillatable chemical substance to the fluid system; and inducing fibrillation among the particles of the chemical substance to thereby result in coalescing of the particles at the leak site.

In another form thereof, the present invention provides a method of patching or sealing a leak in a fluid system having at least one leak site, including the steps of adding a dispersion of polytetrafluoroethylene particles to the fluid system; and inducing fibrillation among the particles to thereby result in coalescing of the particles at the leak site.

In another form thereof, the present invention provides a method of patching or sealing a leak in a fluid system having at least one leak site, including the steps of adding a fibrillatable chemical substance to the fluid system; and cycling the pressure of the fluid system between low and high pressures to induce fibrillation among the particles of the chemical substance and thereby result in coalescing of the particles at the leak site.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Figure 1:
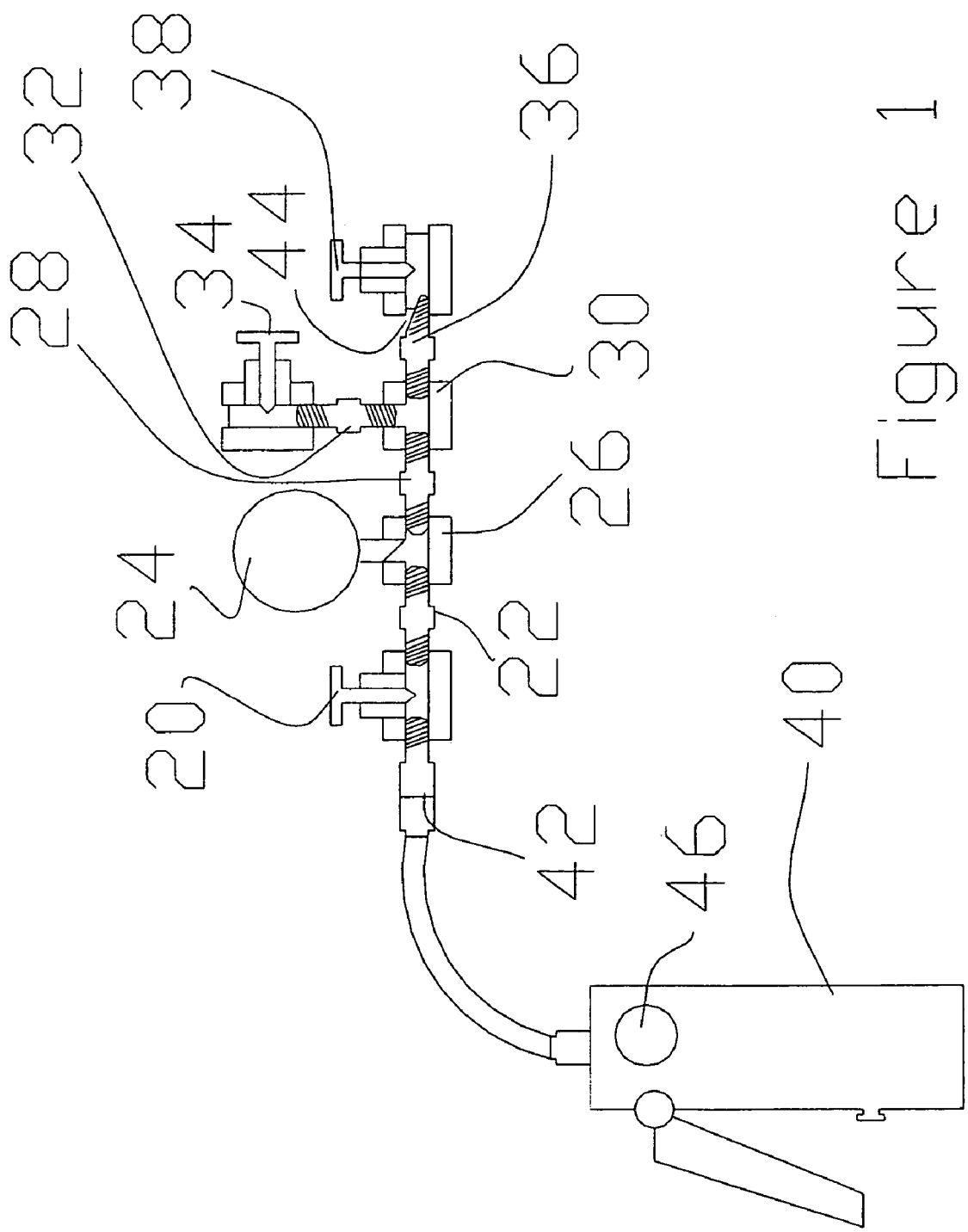
FIG. 1 is a schematic view of a test line apparatus used in Examples 1 and 7.

Corresponding reference characters indicate corresponding parts throughout the several views. The exemplifications set out herein illustrate preferred embodiments of the invention, and such exemplifications are not to be construed as limiting the scope of the invention any manner. Certain features of the present invention are not necessarily drawn to scale in the views, and some features of the present invention have been shown exaggerated in order to better illustrate same.

DETAILED DESCRIPTION

The present invention provides a method for patching or sealing leaks in fluid systems and, in an exemplary application, provides a method for patching leaks in hydraulic systems, leaks in hydraulic lines, leaks in fittings associated with hydraulic lines, and leaks in O-ring seals associated with hydraulic lines and fluid systems, as well as subsurface safety valve leaks, wellhead leaks, hanger leaks, tubing-casing thread leaks, glycol system leaks, down-hole equipment leaks, and sub-sea well control line leaks, for example. Although the present invention is described below and in the following Examples in the context of patching leaks in hydraulic systems, particularly hydraulic systems used in the oil industry, the present invention is more generally applicable to patching or sealing leaks in any fluid system, particularly relatively small sized leaks in water, oil, or other fluid systems.

As described in further detail below, according to the present invention, a pressure- or shear-fibrillatable chemical substance is added to a fluid system which includes one or more leaks, wherein individual particles of the chemical substance, upon fibrillation thereof, intertwine or coalesce to form a dense particle matrix at one or more leak sites within the fluid system to patch one or more leaks.

In one embodiment of the present invention, a fluoropolymer substance which is derived from a dispersion polymerization process, such as an aqueous dispersion or a fine powder of PTFE particles, is added to a fluid system having at least one leak site, such as by injection of the fluoropolymer dispersion or fine powder into the fluid system, in order to patch or seal one or more leaks in the fluid system. In most applications, it is not necessary to drain the existing fluid in the system, such as the hydraulic fluid within a hydraulic system. Rather, the fluoropolymer dispersion or fine powder may be injected into the fluid system in an additive fashion with respect to the fluid already present within the system. Optionally, any fluoropolymer dispersion or fine powder which remains within the fluid system after the leaks have been patched or sealed may be flushed out of the system.

After the fluoropolymer dispersion or fine powder has been added to the fluid system, pressure is applied to the fluid system to force the individual fluoropolymer particles of the fluoropolymer dispersion or fine powder through the leak site, wherein the pressure differential encountered by the fluoropolymer particles between the fluid system and the environment externally of the fluid system generates a shear force on the fluoropolymer particles at the leak site. When the fluoropolymer particles are subjected to this shear force at the leak site, the particles undergo fibrillation, which results in rapid stretching and elongation of the individual fluoropolymer particles to form fibrils. This fibrillation of the fluoropolymer particles causes individual fluoropolymer particles to intertwine or coalesce with one another due to the very close proximity of the individual particles under high pressure. Thus, as used herein, the terms "coalesce" or "coalesceable" mean the physical intertwining with one another of particles of a chemical species responsive to fibrillation of the particles induced by pressure and/or shear forces. Although the precise mechanism by which the fluoropolymer particles fibrillate and coalesce with one another at the molecular level is not completely understood at this time, it has been found that the fibrillation of the fluoropolymer particles with resulting coalescing under pressure causes fibril formation, impaction, and embedment of the coalesced fluoropolymer particles at the leak site, resulting in patching or sealing of the leak.

The foregoing mechanism may be distinguished from the coagulation observed of fluoropolymer particles, particularly that of PTFE micropowder particles in which the particles combine or clump together without the individual particles undergoing a physical change, such as fibrillation, at the particle level. PTFE fluoropolymer micropowders are formed via a suspension polymerization process which usually involves vigorous agitation of an aqueous medium to yield non-fibrillatable solid particles which are also referred to as "granular PTFE". It is known that these types of fluoropolymer particles, particularly PTFE micropowder particles, have a tendency to coagulate with one another, and methods of producing suspensions of such particles without the particles coagulating with one another are typically proprietary, and often rely upon the use of surfactants. As discussed in the Background section above, sealing compositions which include coagulated PTFE are thought to seal leaks by a "bridging" action in which the coagulated PTFE particles agglomerate, or clump together, with one another to physically cover or "bridge" the leak site without the individual particles undergoing a physical change.

Suitable fluoropolymer dispersions for use with the present invention include fluoropolymers which are derived from a dispersion polymerization process, as opposed to a suspension polymerization process. These two processes are well known, and each yield fluoropolymers having distinct properties, as generally discussed in U.S. Pat. Nos. 4,564,661, 5,405,923, 6,870,020. Namely, fluoropolymers formed by dispersion polymerization processes, which include substances referred to in the art as fluoropolymer dispersions and fluoropolymer fine powders, exhibit the characteristic property of particles which fibrillate under shear stress. In contrast, fluoropolymers formed by suspension polymerization processes, which include substances referred to in the art as flouropolymer micropowders, are not fibrillatable.

Aqueous dispersions of fluoropolymers, such as an aqueous dispersion of polytetraflouroethylene ("PTFE") produced by an emulsion or dispersion process, typically yielding PTFE particles having an average particle size of 0.2 microns. Other suitable flurropolymer dispersions include Teflon® PTFE-30 and Teflon® PTFE-30B dispersions, available from DuPont Fluoroproducts of Wilmington, Del. (Teflon® is a registered trademark of E. I. du Pont de Nemours and Company). These dispersions contain approximately 60% by weight of 0.05 to 0.5 micron PTFE resin particles in water, and approximately 8% (by weight of the PTFE) of a nonionic wetting agent and stabilizer. Additionally, various fluoropolymer dispersions with differing compositions may be used such as the following available from DuPont: Teflon® PTFE-304A, Teflon® PTFE-307A, Teflon® PTFE-35, Teflon® PTFE-FPD3584, Teflon® PTFE-TE-3823, Teflon® PTFE-305A, Teflon® PTFE-313A, Teflon® PTFE-B, Teflon® PTFE-K-20, Teflon® PTFE-T30N, Teflon® PTFE-TE3820, Teflon® PTFE-TE3824, Teflon® PTFE-3411-N, Teflon® PTFE-3425-N, Teflon®PTFE-TE 5851-N, Teflon® PTFE-3417B-N, Teflon®PTFE-TE 3856, Teflon® PTFE-TE 3481-N, Teflon® PTFE-TE 3826.

Additionally, the following other fluoropolymers available from Dyneon may also be used, such as Dyneon™ TF-5033, Dyneon™ TF-5034, Dyneon™ TF-5235, Dyneon™ TF-5065RX, Dyneon™ TF-5032, Dyneon™ TF-5035, Dyneon™ TF-5039, and Dyneon™ TF-5040 may be used.

Although fluoropolymer dispersions having particles with a particle size of 0.05 to 0.5 microns have been found effective for use in the present method, fluoropolymer dispersions having particles with particle sizes of as small as 0.01, 0.025, or 0.05 microns, or as large as 0.5, 5.0, or 10 microns would also be suitable.

Also suitable for use with the present invention are fluoropolymer fine powders, which are formed as agglomerated fluoropolymer particles from aqueous fluoropolymer dispersions produced according to dispersion polymerization processes. Examples of such fluoropolymer fine powders include Teflon® 601 A, having an average particle size of 570 microns, Teflon® 612A, having an average particle size of 490 microns, and Teflon® PTFE K-10, having an average particle size of 560 microns, each available from DuPont Fluoroproducts of Wilmington, Del.

In order to force the fluoropolymer particles of the fluoropolymer dispersion or fine powder through the leak at the leak site with shear force to induce fibrillation of the fluoropolymer particles, pressure is applied to the fluid system. Pressure may be applied by any suitable means, such as by a powered hydraulic pump or by a manually-operated hydraulic pump, for example, and may include the use of a pressure vessel, as described in the following Examples. The pressure may be applied via a single pressure application or "boost" in pressure or alternatively, as described below, the pressure may be cycled. It has been found that a pressure of at least 500 psig (pounds per square inch gauge) (3445 kPa) is typically necessary to produce the degree of pressure differential and shear force at the leak site necessary to induce fibrillation with resulting coagulation of the fluoropolymer particles at the leak site, although fibrillation of the particles may be induced with less pressure depending upon the type of chemical substance used, the size of the leak, and other factors. With PTFE, the applied pressure may 500 psig (3445 kPa) or more, 1000 psig (6890 kPa) or more, 1400 psig (9646 kPa) or more, or 1500 psig (10335 kPa) or more to induce fibrillation.

As discussed below in the following Examples, it has been found that once fibrillation and resulting coalescing of the fluoropolymer particles is induced at the leak site, the coalesced fluoropolymer particles typically rapidly patch or seal the leak, which leads to a rapid increase in the system pressure. Once such a rapid pressure rise occurs, indicative of initial leak patching or sealing, it may be desirable to decrease the system pressure, followed by subsequent increases and decreases in the system pressure to induce additional fibrillation and coalescing of fluoropolymer particles at the leak site.

In particular, as observed in the Examples below, once initial patching or sealing of the leak occurs, as evidenced by a rapid rise in system pressure, it may be helpful to further increase the system pressure to partially rupture the initial seal. Partial rupture of the initial seal creates a relatively smaller leak site through the initial seal through which the system fluid and the fluoropolymer dispersion is forced under even greater pressure. This leads to a higher pressure differential at the leak site and generation of higher shear forces to induce further fibrillation of the fluoropolymer at the leak site, thereby forming a second seal which typically has a greater integrity than the initial seal. In this manner, cycling the system pressure to induce one or more ruptures in initial or subsequent seals may induce further fibrillation of the fluoropolymer to produce the strongest seal possible.

As discussed in the Examples below, it has been found that fluid systems having leaks patched according to the present invention may withstand pressures of as high at 10,000 psig (68900 kPa) or 20,000 psig (137800 kPa) or more after the leaks in the system have been patched or sealed. Also, it has been found that the coalesced fluoropolymer particles, particularly PTFE fibrils, are effective in patching leaks regardless of the underlying material in which the leak is present, such as metal, plastic, and rubber materials, for example.

In one embodiment, a suitable sealant composition includes only a PTFE dispersion, such as those described above or similar dispersions, which is added to the fluid system to seal the leak without the need to add any additional components, such as viscosity modifiers, for example.

The present method has several advantages over known methods of patching or sealing leaks in fluid systems, particularly in hydraulic systems. First, fluoropolymer dispersions and fine powders are readily and inexpensively available from many commercial sources. In the present invention, only a single component, namely, the fluororpolymer dispersion or fine powder, need be injected into the fluid system, followed by application of pressure to the system, to patch systems leaks as described above. Thus, multiple chemical components which require mixing and chemical reaction with one another in the system to generate locally polymerized chemical species or precipitates which are operable to patch or seal the leaks are not required, thereby greatly simplifying the present method.

Further, fluororpolymers such as PTFE are known as chemical species which are unreactive with other substances. Thus, use of PTFE to patch or seal a leak in a hydraulic system, for example, shows no visible reaction with chemical components within the hydraulic fluid, which could potentially degrade the leak patch or seal upon further operation of the system after the leak in the system has been patched or sealed. In this manner, the integrity of the leak patch within the system is maintained by the inert characteristics of the PTFE. Additionally, any PTFE within the fluid system which is not coagulated to patch or seal the leak at the leak site will not react with chemical components of the fluid in the system, such that clogging of the system at locations in the system downstream of the leak site is unlikely, and any remaining PTFE which has not coagulated to patch or seal the leak may optionally be flushed from the system.

Also, it has been observed that relatively small amounts of the PTFE dispersion are needed to patch and seal leaks within fluid systems, reducing the expense of the present method and preserving the integrity of the working fluid within the fluid system. For example, when PTFE dispersions are used to patch leaks in a hydraulic systems according to the present invention, the hydraulic fluid within the system is not significantly diluted by the PTFE dispersion, maintaining the operational integrity of the system fluid. The amount of fluoropolymer dispersion needed to seal a leak in a given fluid system will vary in proportion to the leak size and the overall system volume.

It has been observed that the viscosity of the PTFE dispersion can be modified to promote seal initiation in cases wherein the leak is so large that sufficient differential pressure cannot be achieved with a very fluid, non-viscous PTFE dispersion. This viscosity adjustment allows the pressure differential at the leak site to be increased by reducing the leak rate as a function of the flow characteristics of the modified dispersion, thus allowing sufficient pressure to be obtained to promote PTFE fibrillation and coagulation to form an effective seal inside the leak.

For example, it has also been observed that oil can be added into the PTFE dispersion in a formulation to make the dispersion more compatible with oil-system leaks. The introduction of oil into a PTFE dispersion subsequently affects the viscosity and flow characteristics of the PTFE dispersion giving an oil-containing PTFE formulation the ability to resist flow through a leak and increasing the maximum attainable pressure differential above that of a non-altered PTFE dispersion, promoting PTFE fibrillation and coagulation in varying leak conditions and system types.

EXAMPLES

The following non-limiting Examples illustrate various features and characteristics of the present invention, which is not to be construed as limited thereto. Also, several Comparative Examples are set forth to further illustrate various features and characteristics of the present invention. Throughout the Examples and elsewhere herein percentages are by weight unless otherwise indicated.

Example 1

Teflon® PTFE 30B Dispersion

Referring to FIG. 1, a thread leak was simulated inside of a small diameter ¼" (0.635 cm) control line hydraulic system by physically damaging a ¼" (0.635 cm) NPT fitting (36) by grinding the threads away on approximately ¼ of the circumference of the threads so that a clear pathway (44) into the threads existed. The simulated thread leak rate with tap water at 35 psig (241.15 kPa) was determined to be 25 ml/min. The simulated control line was constructed from the following components:
1. ¼" 10,000 psig (68900 kPa) needle inlet valve (20);
2. ¼" 10,000 psig (68900 kPa) stainless steel nipple (22);
3. ¼" 10,000 psig (68900 kPa) "tee" (26), with 10,000 psig (68900 kPa) liquid filled gauge (24);
4. ¼" 10,000 psig (68900 kPa) stainless steel nipple (28);
5. ¼" 10,000 psig (68900 kPa) "tee" (30), with nipple (32) out to ¼" 10,000 psig (68900 kPa) bleed valve (34) and the damaged 10,000 stainless steel ¼" NPT fitting (36) attached to a ¼" 10,000 psig (68900 kPa) outlet valve (38).

An EnerPac 10,000 psig (68900 kPa) hydraulic hand pump (40) was then connected to a ¼" (0.635 cm) chamber (42) that contained 10 ml of Teflon® PTFE 30B fluoropolymer dispersion, described above. The hydraulic/Teflon® PTFE 30B chemical assembly was attached to the control line assembly at the closed ¼" (0.635 cm) needle inlet valve (20).

Water was then injected into the control line through the bleed valve (34), and allowed to flow through the outlet valve (38) on the control line to ensure the leak was clear of any foreign debris. The outlet valve (38) was then closed and water was confirmed exiting at 35 psig (241.15 kPa) from the simulated control line leak point (44) on the ¼" (0.635 cm) damaged fitting (36). The bleed valve (34) was then closed and the pressure in the system immediately fell to 0 psig. The inlet valve (20) was then opened and the Teflon® PTFE 30B chemical was injected into the leak site with the EnerPac hand pump (40). The Teflon® PTFE 30B was displaced into the leak site at 300 psig (2067 kPa) (2067 kPa) until it was visually observed exiting the leak point. The injection rate was then increased to 1500 psig (10335 kPa). The leak plugged after 5 ml of Teflon® PTFE 30B chemical had passed through the leak. The pump pressure was then increased to 5000 psig (34450 kPa) with no visual leakage detected. The pressure was then cycled from 5000 psig (34450 kPa) to 0 psig four times over 2 minutes. The pressure was then increased to 7000 psig (48230 kPa). The seal released approximately ½ ml of Teflon® PTFE 30B, and then re-sealed, stabilizing at 6000 psig (42340 kPa). The pressure was then increased to 10,000 psig (68900 kPa) at 4 minutes. At 5 minutes, the pressure was then cycled two times to zero then back to 10,000 psig (68900 kPa). No leakage was observed and the control line remained stable at 10,000 psig (68900 kPa) for 1 hour.

After 1 hour, the pressure was released through the pump relief valve (46) and the outlet valve (38) was opened. Water was then injected through the bleed line (34) and the remaining 4½ ml of Teflon® PTFE 30B was flushed from the line. No apparent physical change in the residual Teflon®PTFE 30B was evident. The bleed (34) and outlet (38) valves were closed and the control line was pressured to 10,000 psig (68900 kPa) with no leakage occurring, indicating an extremely competent seal had been achieved at the damaged fitting. The fitting was then disassembled and inspected. Fibrillated PTFE had fully penetrated and filled the thread pattern distortions at the damaged area and effectively plugged the control line leak without creating any blockage or restriction inside of the control line.

Example 2

Teflon® PTFE 30B Dispersion

Figure 2:
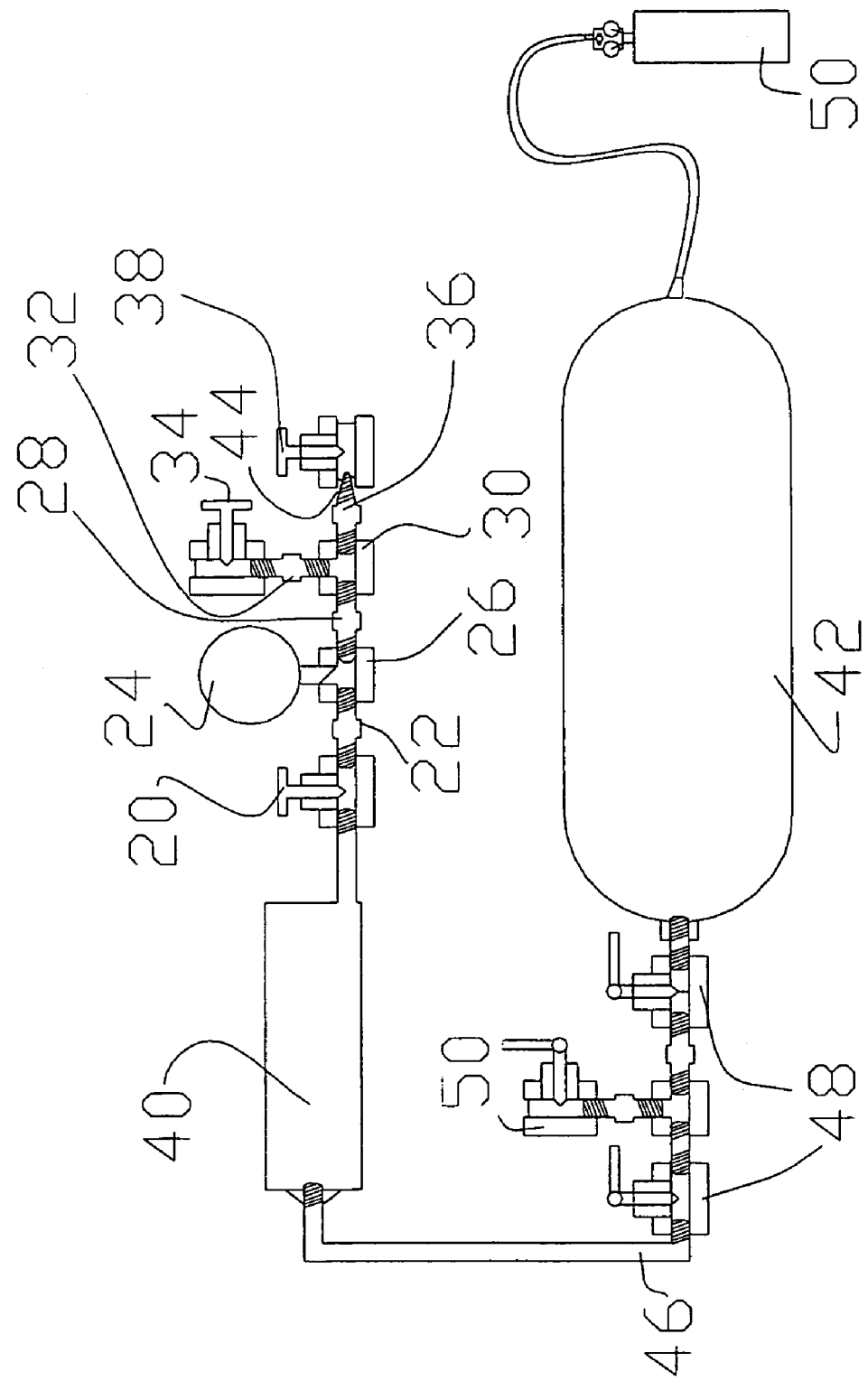
FIG. 2 is a schematic view of a test line apparatus used in Examples 2 and 6.

Referring to FIG. 2, a large leak was simulated inside of a small diameter ¼" (0.635 cm) control line hydraulic system by physically damaging a ¼" (0.635 cm) NPT fitting (36) by grinding the threads away on approximately ¼ of the circumference on two sections of the threads so that a clear pathway (44) into the threads existed at both leak points. The simulated thread leak rate with tap water at 100 psig was determined to be 100 ml/min. The simulated control line was constructed as follows:
1. ¼" 10,000 psig (68900 kPa) needle inlet valve (20);
2. ¼" 10,000 psig (68900 kPa) stainless steel nipple (22);
3. ¼" 10,000 psig (68900 kPa) "tee" (26), with 10,000 psig (68900 kPa) liquid filled gauge (24);
4. ¼" 10,000 psig (68900 kPa) stainless steel nipple (28);
5. ¼" 10,000 psig (68900 kPa) "tee" (30), with nipple (32) out to ¼" 10,000 psig (68900 kPa) bleed valve (34) and the damaged 10,000 stainless steel ¼" NPT fitting (36) attached to a ¼" 10,000 psig (68900 kPa) outlet valve (38).

A 500 gallon (1893 L) high-pressure water vessel (42) was utilized to pressurize the control line and establish flow through the leak point. The 500 gallon (1893 L) vessel (42) was filled with tap water and pressurized to 1400 psig (9646 kPa) with a nitrogen supply (50). A sealant chamber (40) that contained 500 ml of Teflon® PTFE 30B fluoropolymer dispersion, described above, was connected directly to the control line leak apparatus. The high pressure vessel (42) was connected with ¼" (0.635 cm) lines (46) and fittings to the other end of the chamber to allow pressure to flow from the tank (42) to the sealant chamber (40) and then into the control line leak (44). The high pressure vessel (42) was equipped with a shut-off valve (48) and a bleed valve (50) to control the flow of fluid into the control line. The sealant chamber (40) and control line leak (44) were then pressurized instantaneously with fluid from the high-pressure vessel (42) at 1400 psig (9646 kPa). Upon reaching the leak site (44) the Teflon® PTFE 30B sealed the leak at 3 ml displacement volume with the high volume flow at 1400 psig (9646 kPa). Once the initial seal was established the pressure was cycled 4 times then the sealant chamber (40) was removed and the control line leak apparatus was connected to an EnerPac 10,000 psig (68900 kPa) hydraulic hand pump to more accurately control the pressure on the line as depicted in FIG. 1.

Over the next 10 minutes the pressure was cycled between 1400 psig (9646 kPa) and 2000 psig (13780 kPa) without further leakage from the leak point. At 5-minute intervals the control line pressure was increased in 1000 psig (6890 kPa) increments to 5000 psig (34450 kPa). The pressure was then cycled to 0 psig and then re-pressured to 5000 psig (34450 kPa). The pressure was then gradually increased to 8000 psig (55120 kPa) at which point the seal ruptured. 2 ml of fluid exited from the leak point then re-established a seal at 2000 psig (13780 kPa). The new seal was cycled as before until a 4400 psig (30316 kPa) seal was established and holding. The pressure was held for 22 hours without leakage. The pressure was then increased to 8000 psig (55120 kPa) and held without leakage, indicating an extremely competent seal had been achieved at the damaged fitting. The fitting was then disassembled and inspected. Fibrillated PTFE had fully penetrated and filled the thread pattern distortions at the damaged area (44).

Example 3

Teflon® PTFE 30B Dispersion

Figure 3:
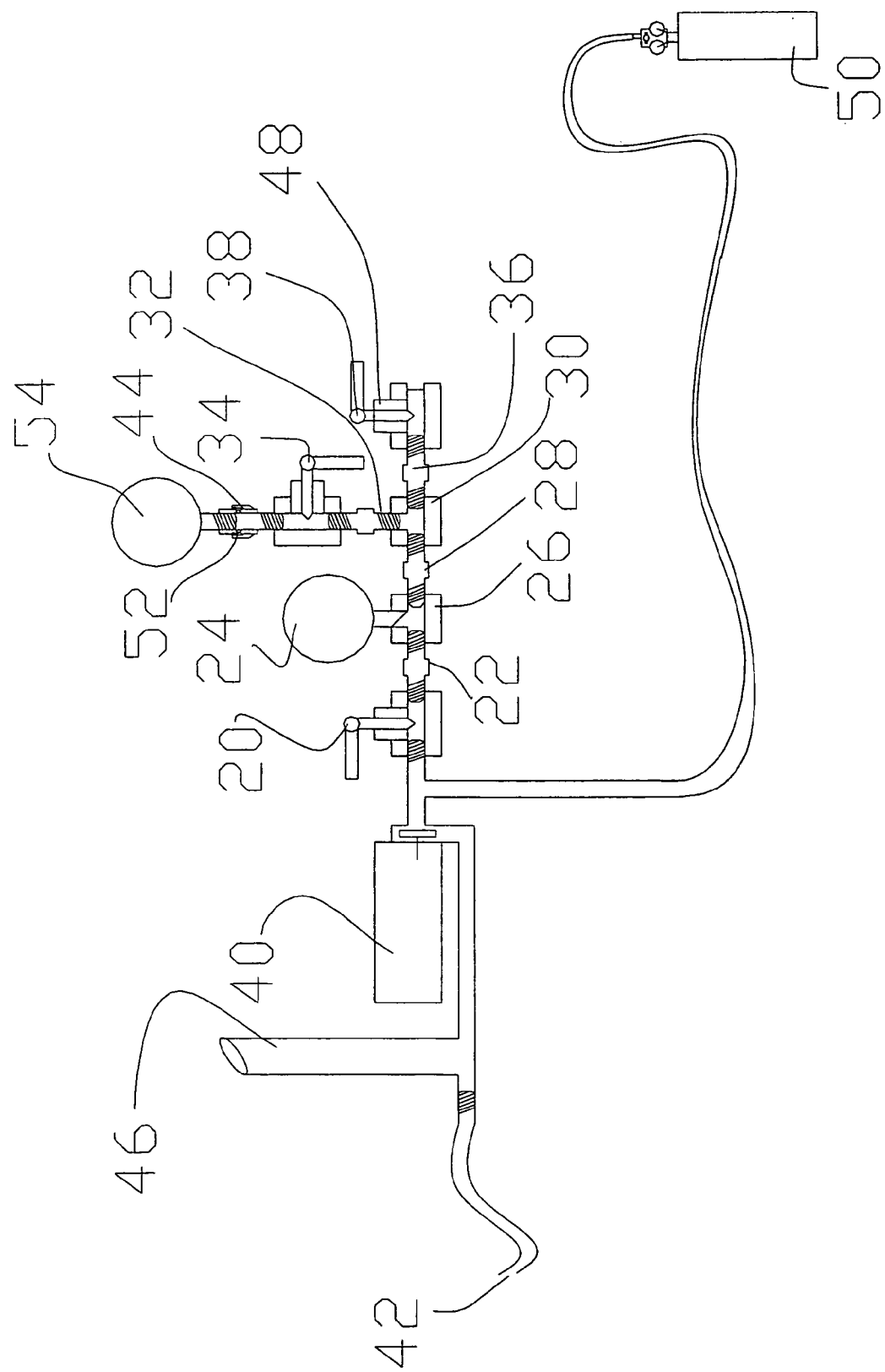
FIG. 3 is a schematic view of a test line apparatus used in Example 3.

Referring to FIG. 3, a nitrile rubber O-ring leak was simulated on a 2500 psig (17225 kPa) ¼" (0.635 cm) NPT Parker quick-coupling (44). The rubber O-ring (52) was removed and physically damaged to create a leak. The O-ring was pressurized with nitrogen and rapid leakage was observed at less than 20 psig (137.8 kPa), but was not quantified to determine the actual rate of leakage of the gas. The leak assembly was then connected to a 2500 psig (17225 kPa) rated assembly including:
1. ¼" NPT 2500 psig (17225 kPa) carbon-steel ball valve (inlet) (20);
2. ¼" NPT 2500 psig (17225 kPa) carbon-steel nipple (22);
3. ¼" NPT 3000 psig "tee" (26), with 2500 psig (17225 kPa) liquid filled gauge (24);
4. ¼" NPT 2500 psig (17225 kPa) carbon-steel nipple (28);
5. ¼" NPT 2500 psig (17225 kPa) "tee" (30) with nipple (32) out to ¼" NPT 2500 psig (17225 kPa) carbon-steel ball-valve (34) connected directly to the simulated leak assembly and dead-headed against a second 3000 psig liquid filled gauge (54), and on the second outlet, a ¼" NPT carbon-steel nipple (36) and ¼" NPT carbon-steel ball-valve (38) (bleeder and outlet).

A simple 12-volt centrifugal pump (40) capable of pumping ⅓ gallon/minute (1.25 L/min.) at 95 psig (654.6 kPa) was connected to the inlet of the leak assembly. This pump is of the type commonly used to boost water pressure for reverse-osmosis water purification systems, although the manufacturer of the pump was unknown. The pump was connected to a tap water supply (42) and energized to initiate a flow rate through the O-ring leak (52). Once flow was established Teflon® PTFE-30 dispersion was introduced into the pump suction at (46). 250 ml of Teflon® PTFE-30 was pumped with no reduction in flow rate through the leak. Teflon® PTFE-30B dispersion was then introduced into the pump suction at (46) and an additional 250 ml of same was pumped at 95 psig (654.6 kPa) with no reduction in the leak or flow rate. The pump was disconnected and a nitrogen source (50) was connected to the assembly. A small volume (10 ml) of Teflon® PTFE-30B remained in the ¼" (0.635 cm) 2500 psig (17225 kPa) assembly. Nitrogen pressure was applied. The assembly pressure was increased to 300 psig (2067 kPa) (2067 kPa) and then the nitrogen source (50) was closed to the system. A flow rate was established through the leak with the remaining Teflon® PTFE-30B and was displaced from the leak.

At the point that nitrogen gas began flowing through the O-ring seal (52) the pressure fell rapidly in the system to 200 psig (54) at which point it stabilized. No further nitrogen gas was observed flowing through the leak and the pressure remained steady at 200 psig (1378 kPa) for 10 minutes. The nitrogen supply was opened and the pressure was slowly increased to 400 psig (2756 kPa) with no leakage from the leak point (52). The assembly was then submerged in water to verify that no gas was leaking from the O-ring. After 16 hours the pressure fell to 300 psig (2067 kPa), and a slight leak through the stem-packing (48) on the ¼" outlet valve (38) was discovered. The seal was re-pressured with nitrogen to 400 psig (2756 kPa) and confirmed that a seal had been formed across the simulated leak. The O-ring was dismantled and inspected. Fibrillated PTFE was observed filling in the damaged sections of the O-ring, that provided a sufficient seal to hold low pressures in the 0-400 psig (0-2756 kPa) range.

Example 4

Teflon® PTFE 30 Dispersion

Figure 4:
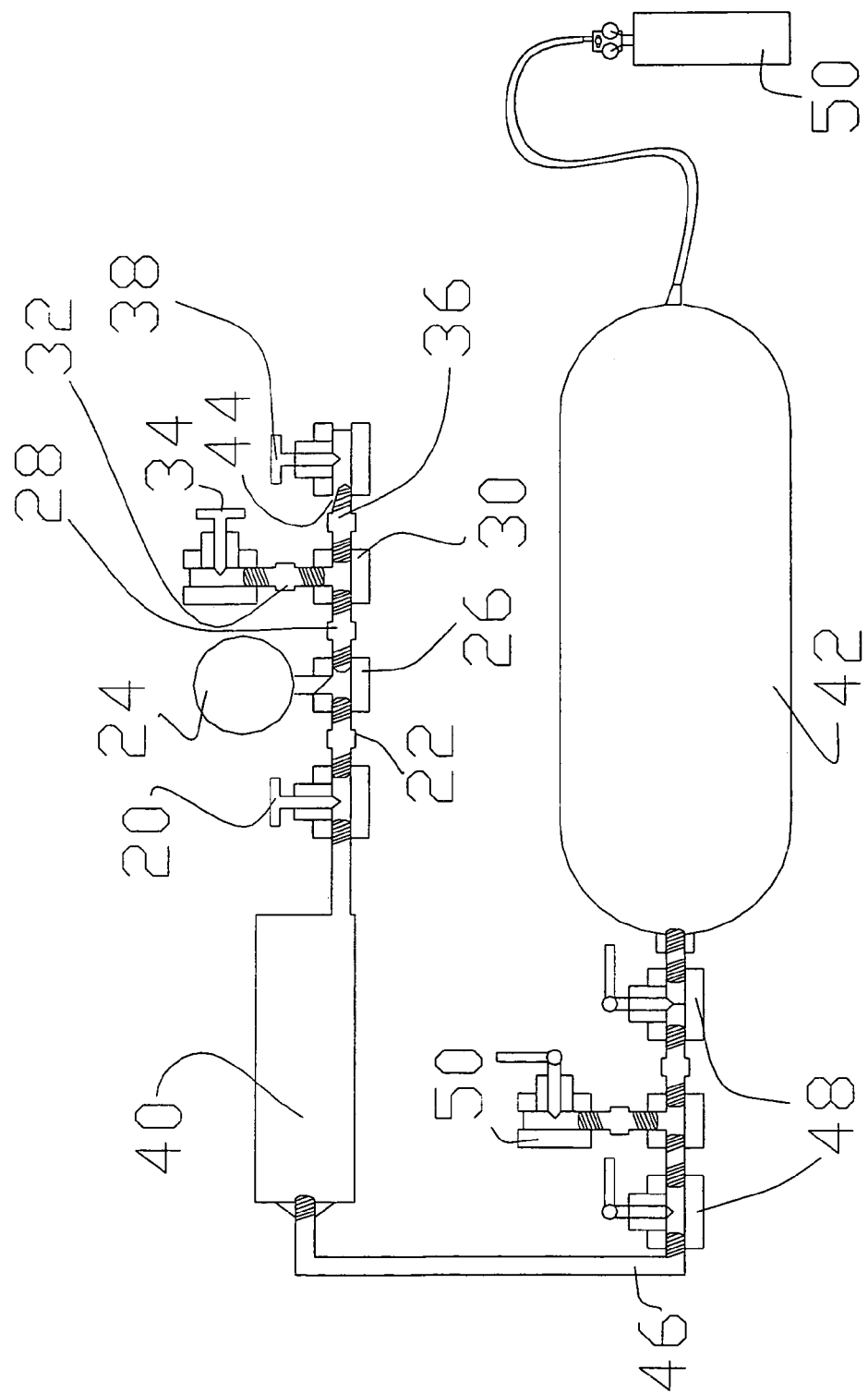
FIG. 4 is a schematic view of a test line apparatus used in Example 4.

Referring to FIG. 4, a simulated thread leak was tested utilizing the same apparatus as in Example 3, however, the O-ring fitting was removed and the valve attached was converted to a bleeder valve (34). The remaining valve was removed and the ¼" (0.635 cm) nipple (36) was damaged by filing a groove perpendicular to the threads and the valve re-attached to the lower portion of the assembly. A leak of 10 ml/min @ 500 psig (3445 kPa) was induced.

A high-pressure water-filled vessel (42) was utilized to provide hydraulic force to displace sealant through the leak. The vessel was pressurized to 1500 psig (10335 kPa) to begin. A 2"×8" (5.08 cm×20.32 cm) 2500 psig (17225 kPa) chamber (40) was filled with Teflon® PTFE-30 for the test. The pressure vessel was then connected into the sealant chamber that was then connected directly into the leak assembly apparatus. The pressure from the high-pressure vessel was gradually applied to 500 psig (3445 kPa). When flow through the leak (44) was established, the pressure was raised to 1500 psig (10335 kPa) on the system. An undeterminable amount of Teflon® PTFE-30 passed through the leak (44) before a seal was established after the system pressure reached 1500 psig (10335 kPa). After 10 minutes, the pressure was cycled four times between 0 psig and 1500 psig (10335 kPa) with no leakage through the simulated leak. The system was then shut in for 30 minutes and disassembled for inspection. Fibrillated PTFE was found impacted up to the second thread.

Example 5

Teflon® PTFE 30 Dispersion

Figure 5:
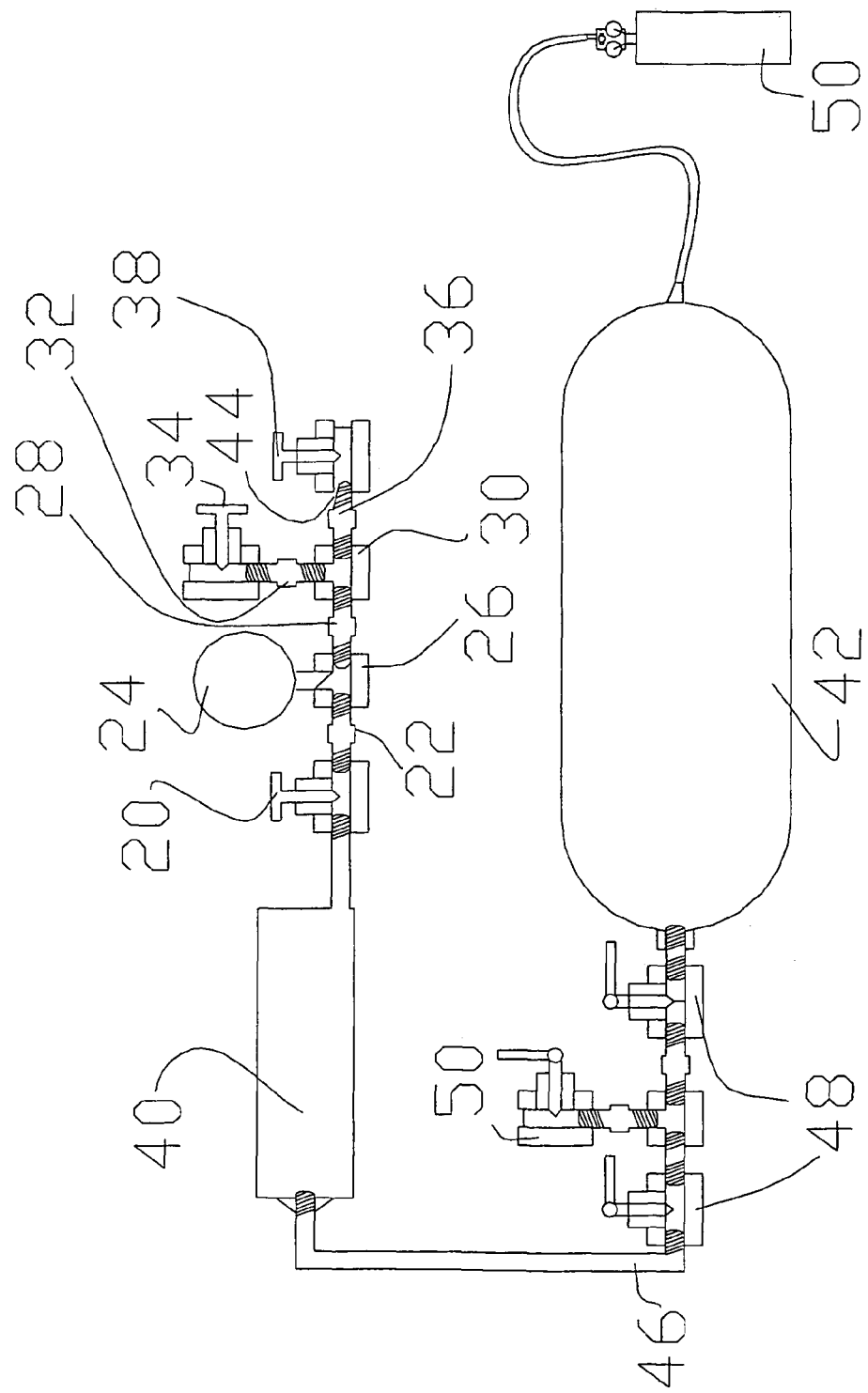
FIG. 5 is a schematic view of a test line apparatus used in Example 5.

Referring to FIG. 5, a continuation of Example 4. After cleaning the damaged fitting (36) the apparatus was re-assembled to re-test the material. The fitting was still impacted with minute amounts of fibrillated PTFE that continued to "re-seal" the leak at 500 psig (3445 kPa). The PTFE embedded fittings were then discarded a new leak was simulated by grinding the threads deep into the pipe-wall of the ¼" (0.635 cm) nipple (36). A new ¼" (0.635 cm) carbon-steel ball valve (38) was screwed onto the damaged nipple (36) and the system was pressurized to establish a leak rate of 30 ml/minute at 100 psig. The chemical chamber (40) was refilled with Teflon® PTFE-30 and attached to the system and high-pressure vessel. Pressure was rapidly (instantaneously) increased to 1500 psig (10335 kPa) for this test and a small amount of Teflon® PTFE-30 again passed through the leak (44) and rapidly established a seal eliminating the flow from the damaged fitting (36). The pressure was cycled four times between 0 psig and 1500 psig (10335 kPa) then allowed to sit for 10 minutes at 1500 psig (10335 kPa) with no leak-off. After that time, the leak was then rapidly increased to 1800 psig (12402 kPa) at which point the seal appeared to fail and then reseal, this time maintaining the pressure at 1800 psig (12402 kPa). After 2 additional minutes the pressure was increased to 2000 psig (13780 kPa) without leakage. The pressure was cycled again 4 times between 0 psig and 2000 psig (13780 kPa) successfully maintaining the pressure throughout each cycle. The fittings were then removed and inspected and confirmed fibrillated PTFE embedded into the threads and the leak.

Example 6

Teflon® PTFE 30B Dispersion

Referring to FIG. 2, a continuation of Example 2. After completion of the test described in Example 2, a significant volume of hydraulic fluid had become entrained in the Teflon® PTFE-30B dispersion and a resulting increase in the viscosity was visually noticed. The actual viscosity was not tested, however, the oil containing PTFE dispersion was prepared to test the ability of the oil formulation to seal the same leak as described in Example 2. After cleaning the fittings (36, 38), the apparatus was re-assembled to re-test the material. The leak was tested and indicated that a leak rate of that 125 ml/min at 95 psig (654.6 kPa) existed. The sealant chamber (40) was filled with Teflon® PTFE-30B containing 30% (by volume) estimated oil volume and 70% Teflon® PTFE-30B. The chamber (40) was then attached to the system and high-pressure vessel (42). The high-pressure vessel was pressurized to 1500 psig (10335 kPa) then the valves (48) on the system were opened to instantaneously deliver the formulated sealant into the leak site. The leak sealed instantly when the formulation impacted the leak point, establishing a seal and eliminating the flow from the damaged fitting at 1500 psig (10335 kPa). The pressure was cycled as in the other experiments and then increased to 2000 psig (13780 kPa) at 10 minutes into the test. An Enerpac 10,000 psig (68900 kPa) hand pump as depicted in FIG. 1, was then hooked into the system and the pressure was increased incrementally to 10,000 psig (68900 kPa) over the next 30 minutes. The leak was shut-in for one hour and then bled to zero and re-pressured 4 times to 10,000 psig (68900 kPa) over the next 5 minutes. The apparatus was flushed with water and re-pressurized to verify the seal was intact at 10,000 psig (68900 kPa). The fittings (36, 38) were then removed and inspected and confirmed fibrillated PTFE embedded inside the threads and the leak with no distortion or reduction in quality as compared to the non-altered formulation.

Example 7

Teflon® PTFE 30B Dispersion

Referring to FIG. 1, a continuation of Example 6. After completion of the test described in Example 6, the Teflon® PTFE-30B dispersion containing 30% hydraulic oil was tested numerous times to repeat the sealing mechanisms for evaluation of the consistency in the ability to achieve a high-pressure seal repeatedly over a short time span. A leak rate of 25 ml/min at 35 psig was verified using water. The leak apparatus was then filled with 10 ml of the Teflon® PTFE-30B containing the 30% (by volume) oil concentration and 70% Teflon® PTFE-30B at (42). An Enerpac 10,000 psig (68900 kPa) hand pump (40) was connected directly and the pressure was increased to achieve 2000 psig (13780 kPa). The leak briefly flowed sealant then plugged and sealed instantly with less than 2 ml of total displacement through the leak. The pressure was cycled similar to the other experiments between 500 psig (3445 kPa) and 2000 psig (13780 kPa) over then next minute. The pressure was then increased rapidly to 5000 psig (34450 kPa) then increased to 10,000 psig (68900 kPa). A small amount of leakage occurred at 9000 psig (62010 kPa) and the pressure fell and stabilized at 6000 psig (42340 kPa). The pressure was then increased to 10,000 psig (68900 kPa) at three minutes. The leak was shut-in for one hour and then bled to zero and re-pressured 10 times to 10,000 psig (68900 kPa) over the next 5 minutes. The apparatus was flushed with water and re-pressured to verify the seal was intact at 10,000 psig (68900 kPa). The system was shut in over night for 12 hours and zero leakage of water through the leak occurred during that interval. This test was then repeated 6 times with the same results as the initial test. The time required to achieve a 10,000 psig (68900 kPa) seal was performed in all of tests between 3 and 8 minutes total elapsed time, indicating good consistency in achieving a high-pressure seal with the methods employed.

Comparative Example 8

Acheson SLA 2010 (PTFE/oil Suspension)

Utilizing the same test assembly shown in FIG. 1 and used in Examples 1 and 7, including a 10,000 psig (68900 kPa) Enerpac hand pump and a leak simulated by damaging a ¼" (0.635 cm) NPT fitting, 5 ml of Acheson SLA 2010 (a PTFE in oil suspension available from Acheson Colloids Company, 1600 Washington Ave, Port Huron Mich. 48060) was added to the leak assembly. The initial leak rate with water was 25 mL/min at 35 lbs. prior to the addition the SLA 2010. A primary seal was established by cycling the pressure with the hand pump between 0 psig and 5000 psig (34450 kPa). After 10 minutes of achieving the 5000 psig (34450 kPa) seal, the pressure was increased to 7000 psig (48230 kPa) and cycled between 5000 psig (34450 kPa) and 7000 psig (48230 kPa). After 10 additional minutes, the pressure was steadily increased and the seal failed at 8000 psig (55120 kPa) and the pressure fell to 5000 psig (34450 kPa) where it stabilized. The pressure was then increased to 8000 psig (55120 kPa) successfully, and then sequentially increased to 9000 psig (62010 kPa) and then 10,000 psig (68900 kPa). At 10,000 psig (68900 kPa) the seal failed, with the pressure again falling to 5000 psig (34450 kPa). The pressure was immediately increased and 10,000 psig (68900 kPa) was achieved momentarily with a slow leakage observed at the leak site. The pressure fell to 9000 psig (62010 kPa) then continued to fall to 6000 psig (42340 kPa) over 30 minutes. The pressure was then increased again to 10,000 psig (68900 kPa) and shut-in. The pressure fell to 9000 psig (62010 kPa) over 15 minutes and continued to fall as total sealing could not be achieved.

The leak assembly was disassembled and the leak path was inspected. The leak path contained only small amounts of material embedded at the end of the leak path, indicating that bridging of coagulated PTFE, in contrast to PTFE fibrillation and coalescing, had occurred. The bridging action of the coagulated PTFE was sufficient to create a blockage capable of holding a pressure of 10,000 psig (68900 kPa), however, it failed to completely seal the leak path.

Comparative Example 9

Acheson SLA 2020 (PTFE/water/polymer Suspension)

Utilizing the same leak assembly and test procedure as in Comparative Example 8, 5 ml SLA 2020 (a PTFE/water/polymer suspension available from Acheson Colloids Company, 1600 Washington Ave, Port Huron Mich. 48060) was tested, which has a higher viscosity than SLA 2010 used in Comparative Example 8. No seal could be established, although a slight pressure increase in the system was observed due to the resistance of the higher viscosity sealant mixture. After all of the SLA 2020 was displaced through the leak, the leak assembly was dismantled and inspected. No PTFE material was observed within the leak path.

Comparative Example 10

Acheson SLA 2030 (PTFE/glycol Suspension)

Utilizing the same leak assembly and procedure as described above in Comparative Examples 8 and 9, identical results were obtained with 5 ml of SLA 2030 (a PTFE/glycol suspension available from Acheson Colloids Company, 1600 Washington Ave, Port Huron Mich. 48060), with no bridging or sealing of the leak observed.

Comparative Example 11

PTFE/Potassium Silicate

In order to test the effectiveness of a PTFE dispersion in a highly viscosified form, 50 ml sodium silicate (available from Oxy Chemical) was added to 100 ml of Teflon I PTFE 30 dispersion. The sealant mixture immediately thickened, apparently flocculating the PTFE and creating a significant viscosity increase, causing the PTFE to come out of the dispersion through apparent coagulation. The sealant mixture was too thick to try to pump into the leak assembly of used in Comparative Examples 8-11. 100 ml of a low viscosity transmission fluid was added in an attempt to decrease the viscosity of the sealant mixture, but only thickened the mixture further. The sealant mixture was blended in a blender to try to break the viscosity, followed by adding 200 ml of additional Teflon® PTFE 30, which thinned the mixture to the point where it appeared usable in the leak assembly.

To explore the difference between the addition of sodium silicate and potassium silicate, another sealant mixture was prepared in which potassium silicate (EcoDrill 317 available from the PQ Corporation) was added to 100 ml of Teflon® PTFE 30 dispersion. The sealant mixture with potassium silicate was slightly viscous but did not appear to add significantly to the viscosity of the Teflon® PTFE 30 dispersion. Based on the foregoing, it is hypothesized that the viscosity increase observed with the sodium silicate was due to flocculation and coagulation of the PTFE particles from the interaction of the sodium ions with the PTFE particles, wherein potassium ions did not appear create a similar effect.

The viscous sealant mixture including sodium silicate and flocculated PTFE was then placed into the leak assembly, except that 2 leak paths on a ¼" (0.635 cm) NPT stainless steel fitting were used, and an air operated Haskell hydraulic ASF 150 pump was used instead of the Enerpac hand pump. Water was pumped through the simulated leak at ½ liter/min at 1000 psig (6890 kPa). The sealant was then introduced at the pump suction and pumped into the leak assembly at 1000 psig (6890 kPa). The viscosified sealant mixture plugged the leak immediately and the pump cycled to 1500 psig (10335 kPa) without observed leaking. The pump was closed and allowed to sit for 10 minutes and then the pressure was raised to 5000 psig (34450 kPa). At 5000 psig (34450 kPa), the seal failed and the sealant mixture exited rapidly from the simulated leak at first then slowed and stopped as pumping continued. The pressure was increased to 6000 psig (42340 kPa) and the seal failed again with the pressure falling to 0 psig as the pump was shut off. The pump was then cycled and pressure climbed to 1500 psig (10335 kPa). The pressure was raised incrementally over the next two hours with a maximum pressure of 15,000 psig (103350 kPa) achieved at one point and then, after a brief shut-in period, the pressure suddenly fell to 12,500 psig and then stabilized. Additional attempts to increase the pressure back to 15,000 psig (103350 kPa) all failed. The pressure then fell to 6000 psig (42340 kPa) and was then cycled to 8000 psig (55120 kPa). The pressure was then bled to 0 psig and the entire system was flushed with fresh water. Once clean, the bleeder valve at the end of the assembly was closed and the system was re-pressurized to 8000 psig (55120 kPa) and shut-in for 15 minutes without leak-off.

The fitting was removed and inspected and found that a combination of coagulated PTFE and fibrillated PTFE were present in the seal. It is hypothesized that the fibrillated PTFE cam from the additional 200 ml Teflon® PTFE 30 that was added to decrease the viscosity of the sealant mixture at the end of the blending process. To verify, another sealant mixture was prepare as discussed below in Comparative Example 12.

Comparative Example 12

PTFE/Sodium Silicate/transmission Fluid

A sealant mixture was prepared by combining 100 ml Teflon® PTFE 30, 10 ml sodium silicate (available from Oxy Chemical) and 90 ml transmission fluid. Although some flocculation and coagulation of the PTFE was observed, the sealant mixture appeared thin in comparison to the sodium silicate sealant mixture of Comparative Example 11, so an additional 100 ml of Teflon® PTFE 30 was added. Additional flocculation and coagulation of the added PTFE was observed, indicating that the coagulating effect is likely related to the relative amounts of available PTFE and sodium ions present. 100 ml of additional Teflon® PTFE 30 was added until significant thickening occurred, but not to the extent as observed with the sodium silicate sealant mixture of Comparative Example 11. Further dilution of the mixture with PTFE was not performed, in an attempt to prevent the presence of non-flocculated PTFE in the system so that a sealant mixture including only coagulated PTFE in suspension would be observed.

The sealant mixture was placed in the same leak assembly as that of Comparative Example 11 and the same test procedure was used. The pressure was raised to 15,000 psig (103350 kPa) at the end of the test, but the seal would not maintain 15,000 psig (103350 kPa) within the leak without rupturing. The final stabilized pressure was 9600 psig (66144 kPa).

Disassembly of the simulated leak fitting showed a high concentration of coagulated PTFE that had bridged the leak opening. No fibrillated PTFE was observed upon inspection of the leak fitting. The sealant mixture demonstrated the ability to seal the leak up to relatively high pressures, such as 9600 psig (66144 kPa), but the seal was not solid and had a tendency to break down under higher pressure.

The foregoing results are attributed to the coagulated PTFE simply bridging the leak, in contrast to the result observed in Examples 1-7 and 14 herein, in which fibrillation of a PTFE dispersion resulted in the formation of a dense matrix of PTFE fibers intertwined and coalesced with one another to provide a high strength seal.

Comparative Example 13

T30 PTFE/T304A PTFE/Transmission Fluid

To further explore the viscosity effect, a sealant mixture was prepared by combining two PTFE dispersions, namely Teflon® PTFE 30 and T304A PTFE. T304A PTFE is highly viscous and provides a viscosified, yet non-coagulated PTFE dispersion, in contrast to the highly viscous and coagulated PTFE dispersions used in Comparative Examples 11 and 12. Specifically, the sealant mixture was prepared by combining 200 ml Teflon® PTFE 30, 200 ml T304A PTFE (which is very viscous), and 200 ml transmission fluid, with the sealant mixture having the same approximate viscosity as the sealant mixtures used in Comparative Examples 11 and 12.

The same leak assembly as that used in Comparative Examples 11 and 12 was used, and the leak rate was simulated at the same ½ L/min at 1000 psig (6890 kPa) with the Haskell hydraulic pump. The sealant mixture was poured into the Haskell pump suction and displaced into the leak at 1000 psig (6890 kPa). The mixture flowed freely through the leak and the pressure increased to 1300 psig from the increased viscosity within the system attributed to the sealant mixture. 50 ml of the sealant mixture was pumped through the leak site without plugging the leak. A pressure vessel similar to that shown in FIGS. 2, 4, and 5 and described above was filled with water and pressurized to 1500 psig (10335 kPa) with compressed nitrogen. The vessel was connected to the system to apply pressure against the sealant at the leak site to attempt to induce fibrillation of the PTFE at the leak site. The valve on the vessel was opened rapidly and then closed with the pressure cycling between 0 psig and 1500 psig (10335 kPa). On the third attempt, the leak began to slow at 1500 psig (10335 kPa) and held steady at that pressure for 15 minutes. The Haskell pump was then used to increase pressure on the system. After 15 minutes, the leak was pressured to 2000 psig (13780 kPa), 3000 psig (20670 kPa), and 4000 psig (27560 kPa) sequentially. At 4000 psig (27560 kPa), the seal failed and the pressure fell and stabilized at 2800 psig (19292 kPa). The pressure was then successfully pressurized to 4000 psig (27560 kPa) and shut in for an additional 15 minutes. The pressure was again raised incrementally from 4000 psig (27560 kPa) to 9000 psig (62010 kPa) and then increased to 12,000 psig (82680 kPa) before the seal failed, with the pressure falling to 6000 psig (42340 kPa). The pressure was then immediately raised to 15,000 psig (103350 kPa) before it failed again, falling to 9000 psig (62010 kPa) before stabilizing. The pressure was again cycled to 15,000 psig (103350 kPa), four additional times, never holding 15,000 psig (103350 kPa) for more than 1 minute and with the pressure failing to 4200 (28938 kPa), 9600 (66144 kPa), 6500 (44785 kPa), and 12,800 psig (88192 kPa) sequentially. The leak was closed in at 12,800 psig (88192 kPa) and allowed to sit overnight. After 15 hours the pressure had fallen to 4600 psig (31694) and was then pressurized to 12,500 psig (88192 kPa) and shut-in for 24 hours. The pressure fell to 11,000 psig (75790 kPa) over that 24 hour time period and was then increased to 12,500 psig (88192 kPa) and tested at 12,000 psig (88192 kPa) for 1 hour with 200 psig (1378 kPa) leakage in that hour. The assembly was opened and flushed with fresh water and re-pressurized for one hour again with 200 psig (1378 kPa) leakage. The system was bled to 10,000 psig (68900 kPa) and tested with no leakage at 10,000 psig (68900 kPa) for 1 hour.

The leak assembly was disassembled and inspected and a small amount of fibrillated PTFE was found at the exterior end of the leak path. Small amounts of coagulated PTFE were also found within the leak path. This test indicates that the viscosity of the sealant mixture exerts a large influence over the ability of the PTFE particles within the mixture to fibrillate. The viscosified mixture was capable of achieving a significantly higher working pressure of 15,000 psig (103350 kPa) faster than the sealant mixture of Comparative Examples 11 and 12, without a total loss of the seal as was encountered in Comparative Examples 11 and 12. This result was probably attributable to the slight fibrillation of PTFE that had occurred at the end of the leak channel; however, the flow rate at the high viscosity inhibited the fibrillation characteristic, alternatively allowing only coagulation within the leak channel.

Example 14

Teflon® PTFE 30

After exploring viscosity relationships in Comparative Examples 11-13, a further test was conducted using Teflon® PTFE 30 dispersion by itself. The same leak assembly as that used in Comparative Examples 8-13 was used and the leak rates were identical. A sealant composition including 100 ml Teflon® PTFE 30 was placed into the suction chamber of the Haskell pump and same was pump into the system until it was observed exiting the leak. The water filled pressure vessel was then employed to deliver 1500 psig (10335 kPa) against the leak. The pressure was cycled 6 times before an initial seal was established. The pressure was then increased to 2500 psig (17225 kPa) and shut in for 15 minutes. The pressure was cycled between 0 psig and 2500 psig (17225 kPa) four times and then was increased to 5000 psig (34450 kPa). Again the pressure was cycled to 0 psig four times before increasing the pressure to 10,000 psig (68900 kPa). The seal gave way momentarily and the pressure then fell back to 6000 psig (42340 kPa). The pressure was then raised to 12,500 psig (88192 kPa) and shut-in. The seal failed and the pressure again fell back to 9000 psig (62010 kPa). The pressure was then cycled from 9000 psig (62010 kPa) to 0 psig four times and was then raised to 12,500 psig and shut-in for 16 hours. The pressure had fallen to 11,000 psig (75790 kPa), but no leakage from the leak site was observed. The pressure was raised instantly to 15,000 psig (103350 kPa) and shut in, then it was cycled 4 times from 0 psig to 15,000 psig (103350 kPa). The seal held without problem and the end valve was opened and the line flushed with water. The assembly was re-pressurized and tested at 13,000 psig and thereafter, the leak held and no moisture was observed.

The leak was inspected after disassembly and it was observed that fibrillated PTFE had completely penetrated and embedded within the leak, in contrast to the results observed in Comparative Examples 8-13, in which highly viscosified and coagulated PTFE mixtures were used, and bridging of the leaks with minimal fibrillation of the PTFE, if any, was observed.

Example 15

Du Pont Fine Powder PTFE 612A

A fine powder mixture was prepared by adding 4 tablespoons (59 ml) Dupont PTFE 612A fine powder into a high speed blender. 8 oz. (237 ml) mineral spirits were then added to the fine powder and blended to separate the dry fine powder agglomerations (clumps). Excess liquid was then poured off of the fine powder leaving 2 oz. (59 ml) of the semi-liquid fine powder mixture. 14 oz. (414 ml) hydraulic oil was then added to the mixture and blended slightly to achieve a uniform mixture. 16 oz. (473 ml) PTFE 30B was then added to the mixture and blended.

A leak apparatus, shown in FIG. 1 and used in several of the above Examples, was constructed to simulate a thread leak in a 10,000 psig (68900 kPa) ¼" (0.635 cm) NPT fitting. A Haskell ASF-150 hydraulic pump was used to pump the sealant mixture into the thread leak. The mixture was poured into the Haskell pump suction and then pumped towards the leak. 3 oz. (89 ml) of sealant was pumped into and through the leak and the system pressure was increased from 200 psig (1378 kPa) initial leak pressure to 1500 psig (10335 kPa) as the sealant entered the leak site. At this point, the pump suddenly lost the ability to pump the sealant. Water was then injected into the pump suction under 35 psig (241 kPa) pressure and the pump was unable to pump the water under pressure. The pump was disassembled to inspect the suction and discharge valves for blockage. Fibrillated PTFE was found to have totally filled both the suction and discharge valves rendering the inability to pump further liquid once the valves had become blocked with the transformed sealant.

Although the test failed to successfully seal the simulated leak due to the inability to pump the initial mixture, it demonstrates the ability of the fine powder PTFE mixture to fibrillate at relatively low pressures and confirms that the fibrillation initiated at the point of pressure differential within the pump valves themselves. No fibrillated PTFE was found within the pump chamber, only in the valve seats and slightly beyond.

Example 16

Du Pont Fine Powder PTFE 612A

Using the same leak apparatus as Example 15 a second test was conducted. To eliminate the problems previously encountered when pumping the sealant mixture through the Haskell pump, a 1-liter volume chamber filled with the sealant mixture was fitted into the system between the leak site and the pump discharge valve. Water was used to displace the sealant from the chamber to the leak site. The same ¼" (0.635 cm) NPT thread leak was simulated and the sealant was injected into the leak. 4 oz. (118 ml) of sealant was displaced through the leak at 300 psig (2067 kPa) before the leak initially sealed. The pressure was then increased to 1500 psig (10335 kPa) then to 1800 psig (12402 kPa) over 5 minutes. After waiting one hour, the leak was pressurized to 3000 psig (20670 kPa)(the maximum working pressure of the sealant chamber). The leak was allowed to sit for one hour and the pressure fell to 2000 psig (13780 kPa). 3000 psig (20670 kPa) was again applied to the leak and then cycled 4 times between 3000 psig and zero. Re-pressuring of the leak yielded zero leak-off from 3000 psig.

The leak connection was disassembled and inspected and found substantial amounts of fibrillated PTFE embedded within the leak channel and around the perimeter of the threaded connection. In contrast to previous examples, the fine-powder PTFE exhibited a propensity to fibrillate at lower shear stress than the aqueous dispersions thus providing additional sealing properties for additional application scenarios.

Additional objects, advantages and other novel features of the invention will become apparent to those skilled in the art upon examination of the foregoing or may be learned with practice of the invention. The foregoing description of preferred embodiments of the invention has been presented for purposes of illustration and description. It is not intended to be exhaustive or to limit the invention to the precise form disclosed. Modifications or variations are possible in light of the above teachings. The embodiments were chosen and described to provide the best illustrations of the principles of the invention and their practical application, thereby enabling one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of patching or sealing a leak in a fluid system having at least one leak site, comprising the steps of:
    adding non-fibrillated particles of a fibrillatable chemical substance to the fluid system; and
    inducing fibrillation among the particles of the chemical substance at the leak site to thereby result in coalescing of the particles at the leak site to form a dense matrix of particles impacted and embedded within the leak site.

2. The method of claim 1, wherein said fibrillatable chemical substance is a fluoropolymer.

3. The method of claim 2, wherein said fluoropolymer is derived from a dispersion polymerization process.

4. The method of claim 1, wherein said inducing step comprises inducing fibrillation among particles of the chemical substance via the application of at least one of pressure and shear forces to the particles.

5. The method of claim 1, wherein said inducing step comprises cycling the pressure of the fluid system between relatively low and high pressures.

6. The method of claim 1, wherein said adding step comprises adding an aqueous fluoropolymer dispersion to the fluid system.

7. The method of claim 6, wherein said adding step comprises adding a dispersion of polytetrafluoroethylene particles to the fluid system.

8. The method of claim 7, wherein the polytetrafluoroethylene particles of the dispersion have a particle size of between 0.01 and 10 microns.

9. The method of claim 8, wherein the polytetrafluoroethylene particles of the dispersion have a particle size of between 0.025 and 5.0 microns.

10. The method of claim 9, wherein the polytetrafluoroethylene particles of the dispersion have a particle size of between 0.05 and 0.5 microns.

11. The method of claim 1, wherein said adding step comprises adding a fluoropolymer fine powder to the fluid system.

12. The method of claim 1, wherein said inducing step comprises applying a pressure of at least 500 psig (3445 kPa) to the fluid system.

13. The method of claim 1, wherein said inducing step comprises applying a pressure of at least 1000 psig (6890 kPa) to the fluid system.

14. The method of claim 1, wherein said inducing step comprises applying a pressure of at least 1500 psig (10335 kPa) to the fluid system.

15. The method of claim 1, wherein said inducing step further comprises inducing fibrillation among the particles of the chemical substance within the leak site to thereby result in coalescing of the particles within the leak site.

16. A method of patching or sealing a leak in a fluid system having at least one leak site, comprising the steps of:
    adding a dispersion of non-fibrillated, fibrillatable polytetrafluoroethylene particles to the fluid system; and
    inducing fibrillation among the particles at the leak site to thereby result in coalescing of the particles at the leak site to form a dense matrix of particles impacted and embedded within the leak site.

17. The method of claim 16, wherein the polytetrafluoroethylene particles of the dispersion have a particle size of between 0.025 and 5.0 microns.

18. The method of claim 17, wherein the polytetrafluoroethylene particles of the dispersion have a particle size of between 0.05 and 0.5 microns.

19. The method of claim 16, wherein said inducing step comprises inducing fibrillation among particles of the chemical substance via the application of at least one of pressure and shear forces to the particles.

20. The method of claim 16, wherein said inducing step comprises cycling the pressure of the fluid system between relatively low and high pressures.

21. The method of claim 16, wherein said inducing step comprises applying a pressure of at least 500 psig (3445 kPa) to the fluid system.

22. The method of claim 16, wherein said adding step comprises adding a fluoropolymer fine powder to the fluid system.

23. The method of claim 16, wherein said inducing step comprises applying a pressure of at least 1000 psig (6890 kPa) to the fluid system.

24. The method of claim 16, wherein said inducing step comprises applying a pressure of at least 1500 psig (10335 kPa) to the fluid system.

25. The method of claim 16, wherein said inducing step further comprises inducing fibrillation among the particles of the chemical substance within the leak site to thereby result in coalescing of the particles within the leak site.

26. The method of claim 16, wherein the polytetrafluoroethylene particles of the dispersion have a particle size of between 0.01 and 10 microns.

27. A method of patching or sealing a leak in a fluid system having at least one leak site, comprising the steps of:
    adding non-fibrillated particles of a fibrillatable chemical substance to the fluid system; and
    cycling the pressure of the fluid system between low and high pressures to induce fibrillation among the particles of the chemical substance at the leak site to thereby result in coalescing of the particles at the leak site to form a dense matrix of particles impacted and embedded within the leak site.

28. The method of claim 27, wherein said adding step comprises adding a dispersion of polytetrafluoroethylene particles to the fluid system.

29. The method of claim 28, wherein the polytetrafluoroethylene particles of the dispersion have a particle size of between 0.01 and 10 microns.

30. The method of claim 28, wherein the polytetrafluoroethylene particles of the dispersion have a particle size of between 0.025 and 5.0 microns.

31. The method of claim 30, wherein the polytetrafluoroethylene particles of the dispersion have a particle size of between 0.05 and 0.5 microns.

32. The method of claim 27, wherein said adding step comprises adding a fluoropolymer fine powder to the fluid system.

33. The method of claim 27, wherein said cycling step comprises applying a pressure of at least 1000 psig (6890 kPa) to the fluid system.

34. The method of claim 27, wherein said cycling step comprises applying a pressure of at least 1500 psig (10335 kPa) to the fluid system.

35. The method of claim 27, wherein said cycling step further comprises cycling the pressure of the fluid system between low and high pressures to induce fibrillation among the particles of the chemical substance within the leak site to thereby result in coalescing of the particles within the leak site.

36. The method of claim 27, wherein said cycling step comprises applying a pressure of at least 500 psig (3445 kPa) to the fluid system.

37. A method of patching or sealing a leak in a fluid system having at least one leak site, comprising the steps of:
    adding particles of a fibrillatable chemical substance to the fluid system;
    inducing fibrillation among the particles of the chemical substance at the leak site to thereby result in coalescing of the particles at the leak site;
    at least partially rupturing an initial seal formed by coalescing of the particles in said inducing step; and
    inducing fibrillation among additional particles of the chemical substance at the leak site to thereby result in additional coalescing of the particles at the leak site.

38. A method of patching or sealing a leak in a fluid system having at least one leak site, comprising the steps of:
    adding a dispersion of polytetrafluoroethylene particles to the fluid system;
    inducing fibrillation among the particles at the leak site to thereby result in coalescing of the particles at the leak site;
    at least partially rupturing an initial seal formed by coalescing of the polytetrafluoroethylene particles in said inducing step; and
    inducing fibrillation among additional polytetrafluoroethylene particles at the leak site to thereby result in additional coalescing of the particles at the leak site.

39. A method of patching or sealing a leak in a fluid system having at least one leak site, comprising the steps of:
    adding particles of a fibrillatable chemical substance to the fluid system;
    cycling the pressure of the fluid system between low and high pressures to induce fibrillation among the particles of the chemical substance at the leak site to thereby result in coalescing of the particles at the leak site;
    at least partially rupturing an initial seal formed by coalescing of the particles in said cycling step; and
    inducing fibrillation among additional particles of the chemical substance at the leak site to thereby result in additional coalescing of the particles at the leak site.

* * * * *